United States Patent [19]

Ellis

[11] 4,073,317
[45] Feb. 14, 1978

[54] ADJUSTABLE CLAMPING DEVICE

[75] Inventor: James B. Ellis, Grand Junction, Colo.

[73] Assignee: Fibreboard Corporation, San Francisco, Calif.

[21] Appl. No.: 724,418

[22] Filed: Sept. 20, 1976

[51] Int. Cl.$^2$ .......................... F16L 9/14; F16L 33/02
[52] U.S. Cl. ...................................... 138/147; 138/149; 24/271; 24/68 E; 24/270
[58] Field of Search ............... 24/271, 273, 68 E, 270, 24/70 ST, 68, 69 ST; 285/252; 138/147

[56] References Cited

U.S. PATENT DOCUMENTS

| 207,470 | 8/1878 | Wolf | 24/270 |
|---|---|---|---|
| 3,423,804 | 1/1969 | Hatfield | 24/273 |
| 3,449,798 | 6/1969 | Hofmann | 24/273 |

FOREIGN PATENT DOCUMENTS

| 283,445 | 1/1928 | United Kingdom | 29/273 |

Primary Examiner—Bernard A. Gelak
Attorney, Agent, or Firm—Phillips, Moore, Weissenberger, Lempio & Majestic

[57] ABSTRACT

A clamping device comprises a body portion having a pair of parallel flanges secured to opposite sides thereof and a slot formed through one end of the body portion. A ring is pivotally mounted on the flanges and suitably sized to freely pivot over the one end of the body portion whereby a first end of a strap may be inserted through the ring and reverse folded under the strap. A second end of the strap is then inserted through the slot and is pulled to tighten the strap about an article, such as an insulated pipe. The point whereat the ring is pivotally mounted on the body portion is then pivoted into over-center relationship relative to the point whereat the second end of the strap engages the slot to superimpose the body portion over the second end of the strap to tightly clamp the same about the article.

11 Claims, 3 Drawing Figures

ADJUSTABLE CLAMPING DEVICE

BACKGROUND OF THE INVENTION

This invention relates to a clamping device of the type adapted to tighten a strap about one or more articles. Conventional clamping devices of this type normally comprise a lever pivoted in a fixed manner on opposite ends of a band or strap for tightening the strap about an article upon pivoting of the lever adapted for clamping about an article having one specific diameter and cannot be adjusted for articles having other diameters. Furthermore, the fixed pivot points, pivotally mounting the lever on the strap, dictate close engineering and manufacturing tolerances.

SUMMARY OF THIS INVENTION

An object of this invvention is to provide a non-complex and economical adjustable clamping device of the above type which is adapted to be adjusted by a workman to accommodate cylindrical pipes and the like having varied diameters. The clamping device comprises a body portion or lever having a pair of flanges secured to opposite sides thereof and a slot formed through the body portion. A ring is pivotally mounted on the flanges and suitably sized to freely pivot over one end of the body portion to provide an over-center toggle mechanism for carrying forth the following method steps of this invention.

A first end of a strap is inserted through the ring and is reverse-bent into underlying relationship relative to the strap. A second end of the strap is then inserted and pulled through the slot and the body portion is pivoted into superimposed relationship over the second end of the strap. Such pivoting of the body portion will carry the point whereat the ring is pivoted on the body portion into over-center relationship relative to the point whereat the second end of the strap is pivotally connected to the body portion at the slot formed therethrough.

BRIEF DESCRIPTION OF THE DRAWING

Other objects of this invention will become apparent from the following description and accompanying drawings wherein.

DETAILED DESCRIPTION

Figure 1:
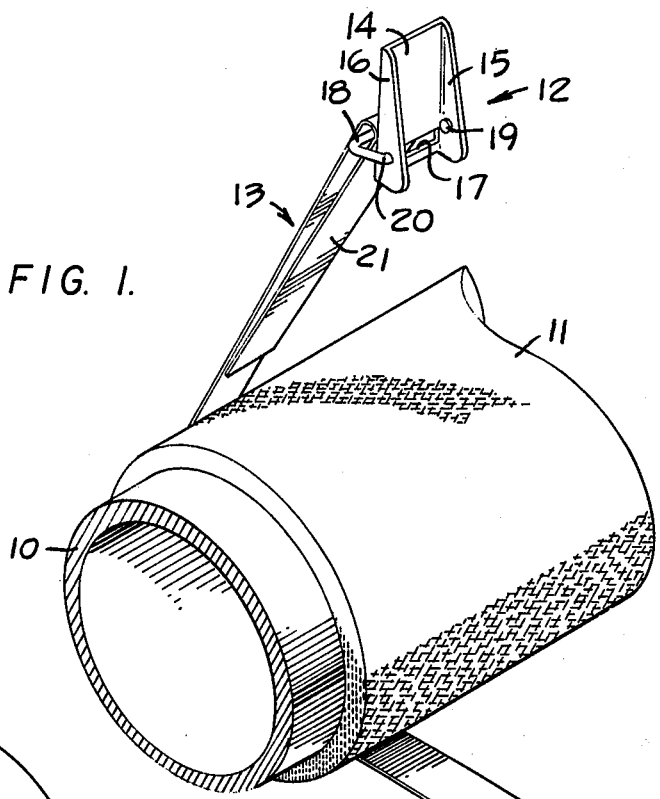
FIG. 1 is an isometric view of the clamping device of this invention, shown attached to a strap which partially circumvents a cylindrical pipe having insulation formed thereon.
Figure 3:
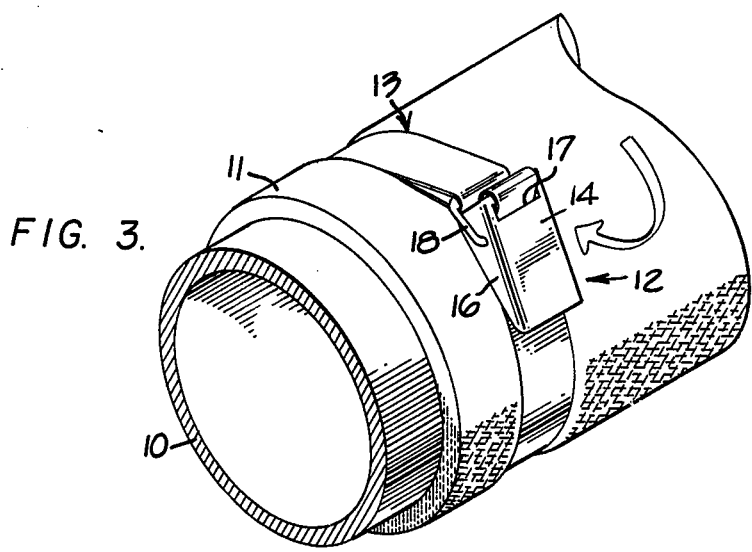
FIG. 3 is a view similar to FIG. 2, but showing the clamping device flipped into over-center relationship over the strap to tighten the strap about the insulation and pipe.

FIG. 1 discloses a cylindrical pipe 10 having a blanket insulation 11 formed circumferentially therearound. A clamping device 12 of this invention is adapted to secure ends of a strap 13 together whereby the insulation will be firmly secured on the pipe, as illustrated in FIG. 3. Although the clamping device of this invention is particularly adapted for applications of this type, it should be understood that it is further adapted to be utilized with other types of straps or bands and for clamping the same about other types of articles, such as bundled ones The clamping device comprises a flat body portion 14 having a pair of parallel flanges 15 and 16 secured to opposite sides thereof. As shown, the flanges taper downwardly from a first end to a second end of the body portion and are secured on the underside thereof. An elongated slot is formed through the body portion, adjacent the first end thereof, and extends transversely substantially across the full width thereof between flanges 15 and 16. A C-shaped ring 18 has first and second ends 19 and 20 thereof bent inwardly on the outboard sides of flanges 15 and 16, respectively, to engage holes formed therein to pivotally mount the ring on the flanges.

As will become apparent hereinafter, the ring is suitably sized to freely pivot over the first end of the body portion to facilitate the over-center clamped condition of the clamping device, shown in FIG. 3.

Figure 2:
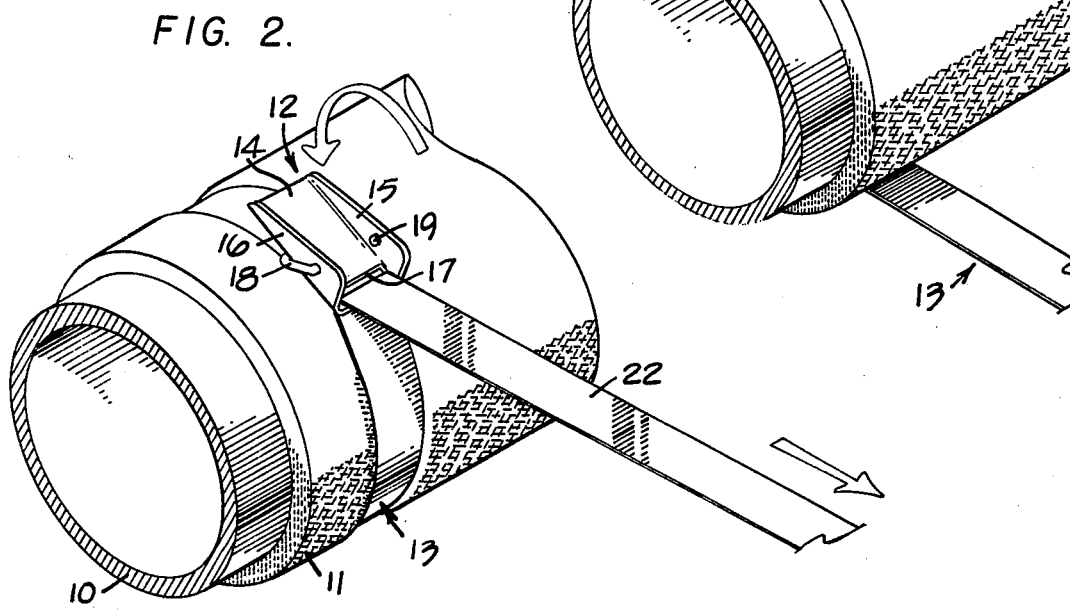
FIG. 2 is a view similar to FIG. 1, but showing the strap inserted through a slot formed in the clamping device.

FIGS. 1-3 sequentially illustrate attachment of clamping device 12 to strap 13 and tightening of the strap circumferentially about pipe 10 and insulation 11. As shown in FIG. 1, a first end 21 of the strap is inserted through ring 18 in a direction from the second end of the body portion 14 towards the first end thereof, having slot 17 formed therethrough. The first end of the strap, which may comprise a suitably composed thin gauged stainless steel material, may be reverse bent prior to insertion in ring 18 or subsequent thereto to dispose it in underlying relationship relative to the strap (FIG.1).

Referring to FIG. 2, body portion 14 of the clamping device is then manipulated to place it over the first end of the strap to fully expose slot 17. A second end 22 of the strap is then inserted through the slot in a direction from the outer side to the inner side thereof. The workman may then pull on the second end of the strap to impose sufficient force thereon to firmly hold the strap in place about insulation 11 (FIG. 2). Body portion 14 of the clamping device is then pivoted from its FIG. 2 position to its FIG. 3 clamped position to superimpose it over second end 22 of the strap.

The latter pivoting of the body portion will function to move the points whereat ends 19 and 20 of ring 18 are pivotally mounted on flanges 15 and 16, respectively, into over-center relationship relative to the point whereat body portion 14 is pivotally connected to the strap, i.e., at slot 17. The unused portion of the strap at the second end thereof may be severed, if so desired. Alternatively, the length of the strap may be pre-sized and cut to a final, usable length by the workman.

I claim

1. A clamping device adapted for securing ends of a strap together comprising a substantially elongated, co-planar and flat body said device terminating at its ends by the end edges of said body, a pair of flanges secured to opposite sides of said body to define a U-shaped cross section throughout the entire length of said clamping device, means defining an elongated slot through said body, adjacent a first end edge thereof, to form the sole interruption therein, and a ring pivotally mounted on said flanges and sized to freely pivot over said first end edge of said body.

2. The clamping device of claim 1 wherein said slot is formed adjacent to the first end of said body portion.

3. The clamping device of claim 2 wherein said ring is pivotally mounted on said flanges adjacent to said slot.

4. The clamping device of claim 1 wherein said flanges are parallel and each tapers downwardly from the first end of said body portion towards a second end thereof.

5. The clamping device of claim 1 wherein said ring is C-shaped and has opposite bent ends thereof disposed on outboard sides of said flanges and pivotally mounted thereon.

6. The clamping device of claim 1 further comprising an elongated strap having a first end thereof inserted through said ring.

7. The clamping device of claim 6 wherein the first end of said strap is inserted through said ring in a direction from a second end of said body portion towards the first end thereof, having said slot formed therethrough, the first end of said strap disposed in underlying and unsecured relationship relative to said strap.

8. The clamping device of claim 7 wherein a second end of said strap is inserted through said slot.

9. The clamping device of claim 8 wherein the second end of said strap is inserted through said slot in a direction from an outer side of said body portion to an inner side thereof and wherein said body portion is superimposed over the second end of said strap with the point whereat said ring pivotally mounts on said flanges being disposed in over-center relationship relative to the point whereat the second end of said strap connects to said body portion at said slot.

10. The clamping device of claim 9 wherein said strap is circumferentially disposed in tightened relationship about a cylindrical pipe.

11. The clamping device of claim 10 further comprising insulation mounted about said pipe and wherein said strap is clamped circumferentially about said insulation.

* * * * *